US012487352B2

(12) United States Patent
Hirano et al.

(10) Patent No.: US 12,487,352 B2
(45) Date of Patent: Dec. 2, 2025

(54) VEHICLE EXTERIOR PART

(71) Applicant: TOYODA GOSEI CO., LTD., Kiyosu (JP)

(72) Inventors: Risa Hirano, Kiyosu (JP); Hiroko Shibakawa, Kiyosu (JP); Norifumi Hattori, Kiyosu (JP); Koji Okumura, Kiyosu (JP); Hideto Maeda, Kiyosu (JP); Yutaka Otsuka, Kiyosu (JP); Keisuke Nishioka, Kiyosu (JP); Kazuyoshi Fujimoto, Kiyosu (JP)

(73) Assignee: TOYOTA GOSEI CO., LTD., Aichi-pref. (JP)

( * ) Notice: Subject to any disclaimer, the term of this patent is extended or adjusted under 35 U.S.C. 154(b) by 456 days.

(21) Appl. No.: 17/692,723

(22) Filed: Mar. 11, 2022

(65) Prior Publication Data
US 2022/0308206 A1 Sep. 29, 2022

(30) Foreign Application Priority Data

Mar. 26, 2021 (JP) ................................. 2021-053900
Jan. 25, 2022 (JP) ................................. 2022-009258

(51) Int. Cl.
*G01S 13/931* (2020.01)
*B60R 13/00* (2006.01)
(Continued)

(52) U.S. Cl.
CPC .......... *G01S 13/931* (2013.01); *B60R 13/005* (2013.01); *F21S 43/26* (2018.01);
(Continued)

(58) Field of Classification Search
CPC ........ B60R 13/00; B60R 13/005; F21S 43/26; G01S 13/931
See application file for complete search history.

(56) References Cited

U.S. PATENT DOCUMENTS 9,983,343 B2 * 5/2018 Tanaka .................. F21S 43/245
10,502,879 B1 * 12/2019 Northcott ............... B22F 1/056
(Continued)

FOREIGN PATENT DOCUMENTS

| CN | 108454533 A | 8/2018 |
|---|---|---|
| JP | 2008-012759 A | 1/2008 |

(Continued)

OTHER PUBLICATIONS

Office Action dated Oct. 1, 2024 issued for the corresponding Japanese Patent Application No. 2022-009258 (and English translation).

(Continued)

*Primary Examiner* — Vladimir Magloire
*Assistant Examiner* — Erik K Hodac
(74) *Attorney, Agent, or Firm* — Posz Law Group, PLC

(57) ABSTRACT

A vehicle exterior part is configured to be arranged frontward of a millimeter wave radar device with respect to the transmission direction of millimeter waves. The vehicle exterior part includes an ornamental body, a light source that emits light, and a light diffuse reflection member. The light diffuse reflection member is millimeter wave-transmissive and diffuses and reflects light. The ornamental body includes a base and an ornamental layer. The base is millimeter wave-transmissive and diffuses and transmits the light. The ornamental layer is millimeter wave-transmissive and arranged frontward of the base with respect to the transmission direction. The light source, the ornamental body, and the light diffuse reflection member are arranged so that the light emitted from the light source is diffused and reflected by the light diffuse reflection member and directed toward the base.

2 Claims, 5 Drawing Sheets

(51) Int. Cl.
  *F21S 43/20*    (2018.01)
  *F21S 43/33*    (2018.01)
  *G01S 13/06*    (2006.01)
  *G01S 13/58*    (2006.01)

(52) U.S. Cl.
  CPC .............. *F21S 43/33* (2018.01); *G01S 13/06* (2013.01); *G01S 13/58* (2013.01)

(56) References Cited

U.S. PATENT DOCUMENTS

| | | | |
|---|---|---|---|
| 10,640,055 B1 * | 5/2020 | Dellock | ............... H01Q 1/3233 |
| 2019/0305412 A1 | 10/2019 | Suzuki et al. | |
| 2020/0083413 A1 * | 3/2020 | Ao | ........................ H01L 33/52 |
| 2020/0124702 A1 | 4/2020 | Fukui et al. | |

FOREIGN PATENT DOCUMENTS

| | | | | | |
|---|---|---|---|---|---|
| JP | 2011-093378 A | | 5/2011 | | |
| JP | 2014070899 A | * | 4/2014 | ............... | G01S 7/03 |
| JP | 2019-069713 A | | 5/2019 | | |
| JP | 2019-171804 A | | 10/2019 | | |
| JP | 2019217863 A | * | 12/2019 | ............. | B60R 13/00 |
| JP | 2020-068069 A | | 4/2020 | | |

OTHER PUBLICATIONS

Office Action dated Feb. 15, 2025 issued for the corresponding Chinese Patent Application No. 202210259347.2 (and English translation).

* cited by examiner

VEHICLE EXTERIOR PART

BACKGROUND

1. Field

The following description relates to a vehicle exterior part attached to an exterior member of a vehicle to decorate the exterior member.

2. Description of Related Art

A millimeter wave radar device installed in a vehicle transmits millimeter waves toward the outside of the vehicle. When the millimeter waves strike an object outside the vehicle such as a front vehicle, a pedestrian, or the like, the millimeter waves are reflected and then received by the millimeter wave radar device. The millimeter wave radar device uses the transmitted and received millimeter waves to recognize the object and detect the distance between the vehicle and the object, the relative velocity of the vehicle and the object, and the like.

The vehicle includes a vehicle exterior part such as a front grille, an emblem, or the like arranged frontward of the millimeter wave radar device in the direction in which the millimeter waves are transmitted.

A typical vehicle exterior part conceals the millimeter wave radar device while allowing for the transmission of millimeter waves. In addition, a vehicle exterior part may also be illuminated.

Japanese Laid-Open Patent Publication No. 2019-217863 describes a vehicle exterior part including an ornamental body, the ornamental body decorating an exterior member of a vehicle, and a light source that emits light. The ornamental body includes a transparent member that transmits millimeter waves and light. The transparent member includes a lighting portion that causes diffuse reflection of light. The light source is arranged outside the peripheral portion of the ornamental body. When the light source emits light, the light passes through the transparent member. The lighting portion then diffuses the passing light. Thus, when the vehicle exterior part is viewed from the outside of the vehicle, the ornamental body (transparent member) will be illuminated and visible.

The ornamental body of the typical vehicle exterior part can be illuminated but may not be bright enough. Thus, there is still room for improvement in increasing the brightness of the ornamental body.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle exterior part is configured to be applied to a vehicle including a millimeter wave radar device that transmits millimeter waves. The vehicle exterior part is configured to be arranged frontward of the millimeter wave radar device with respect to a transmission direction of the millimeter waves. The vehicle exterior part includes an ornamental body that is configured to decorate an exterior member of the vehicle, a light source that emits light, and a light diffuse reflection member that is millimeter wave-transmissive and diffuses and reflects the light. The ornamental body includes a base that is millimeter wave-transmissive and diffuses and transmits the light, and an ornamental layer that is millimeter wave-transmissive and arranged frontward of the base with respect to the transmission direction. The light source, the ornamental body, and the light diffuse reflection member are arranged so that the light emitted from the light source is diffused and reflected by the light diffuse reflection member and directed toward the base.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
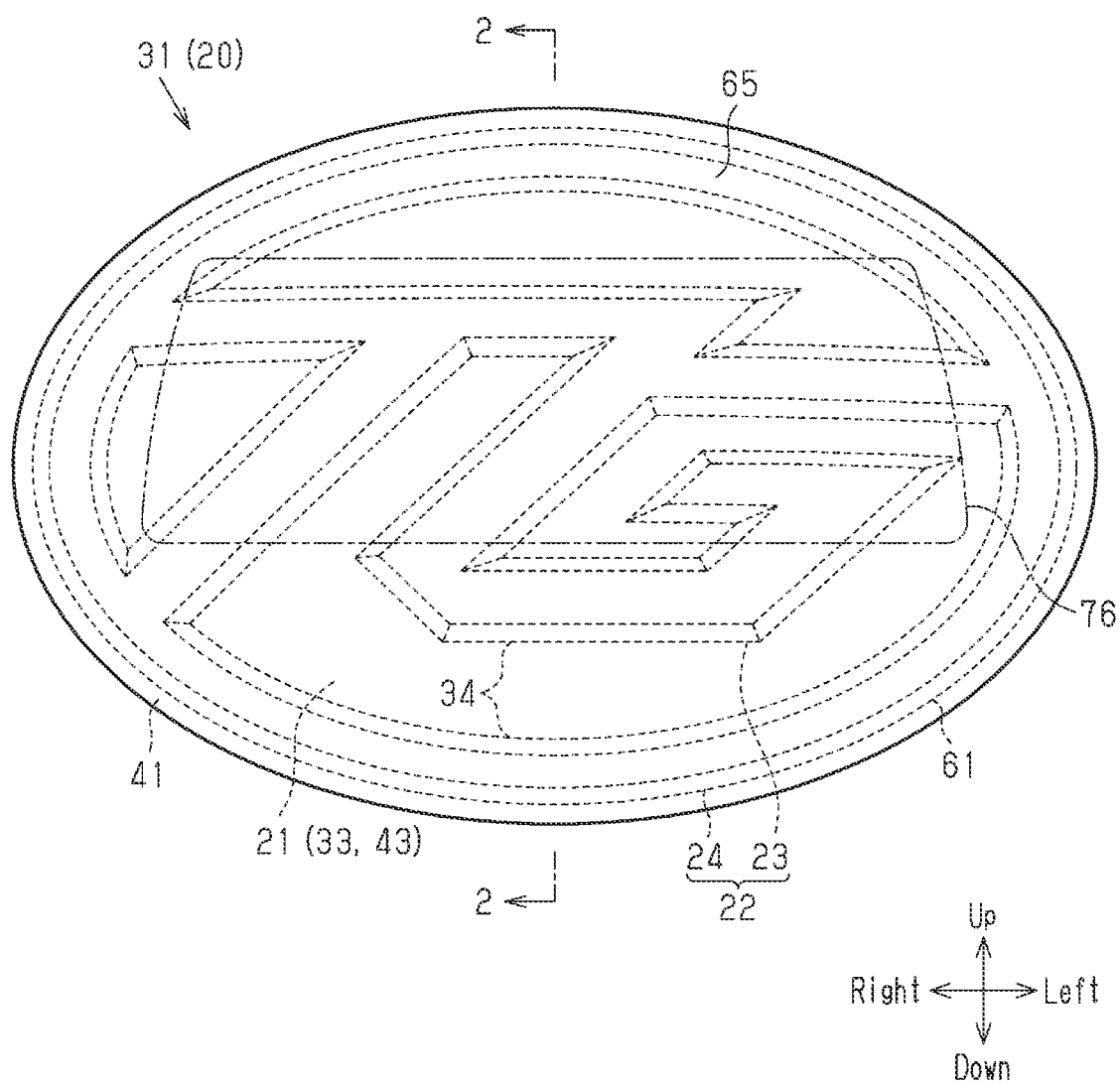
FIG. 1 is a front view of a vehicle exterior part according to a first embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

The term "annular" as used in this description may refer to any structure that forms a loop, or a continuous shape with no ends. "Annular" shapes include but are not limited to a circular shape, an elliptic shape, and a polygonal shape with sharp or rounded corners.

First Embodiment

A vehicle exterior part 20 according to a first embodiment will now be described with reference to FIGS. 1 to 3.

In the following description, the direction in which the vehicle moves forward will be referred to as the frontward direction, and the reverse direction will be referred to as the rearward direction. The vertical direction refers to the vertical direction of the vehicle, and the transverse direction refers to the vehicle width direction that matches with the transverse direction when the vehicle is moving forward. In the drawings, portions of the vehicle exterior part 20 are illustrated for simplicity and clarity and have not necessarily been drawn to scale.

Figure 2:
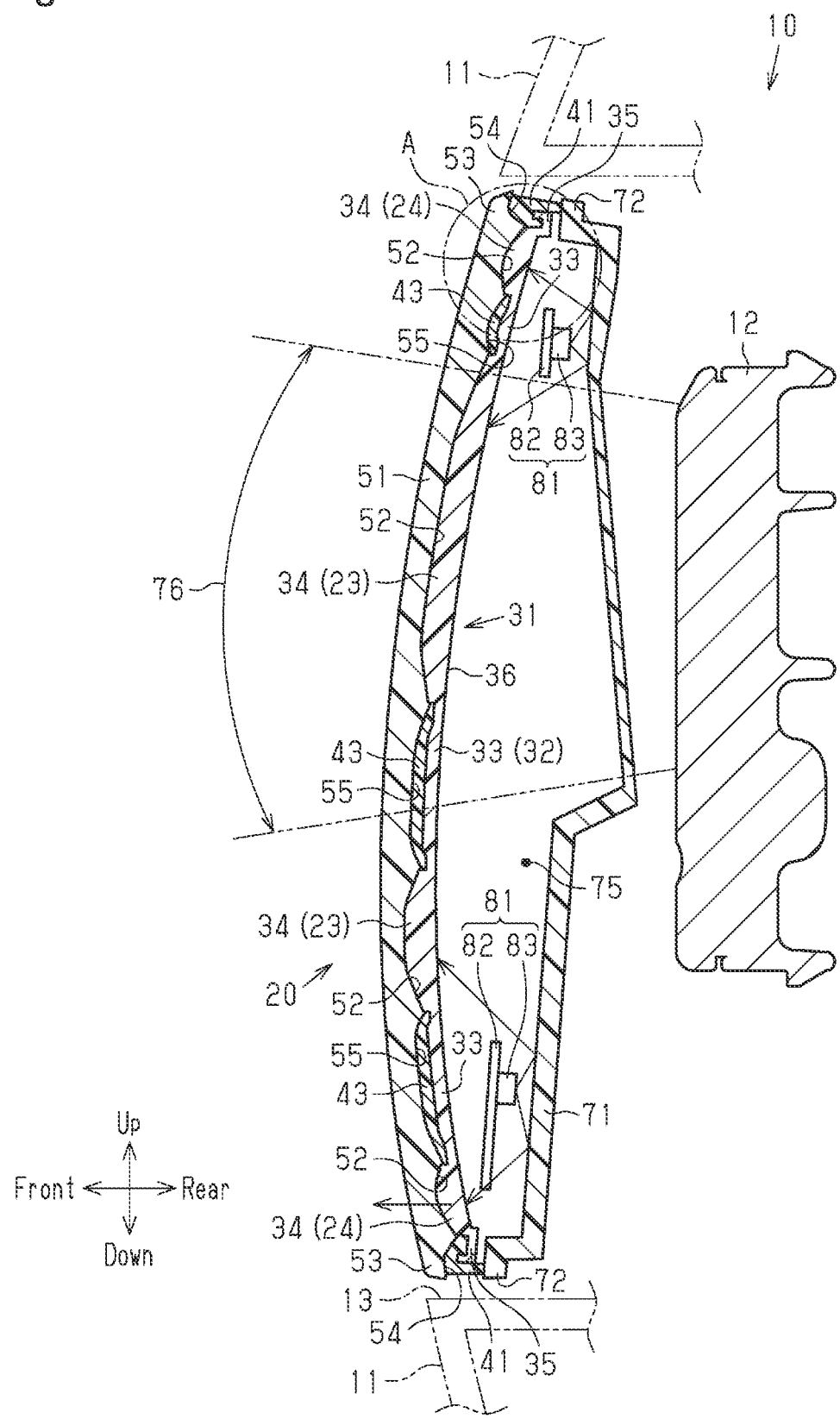
FIG. 2 is a cross-sectional view taken along line 2-2 of FIG. 1.

As shown in FIG. 2, a forward monitoring millimeter wave radar device 12 is installed in the central portion of the front part of the vehicle 10 with respect to the transverse direction and located rearward from a front grille 11. The millimeter wave radar device 12 includes a sensor functionality for transmitting millimeter waves, which is one aspect of electromagnetic waves, in an angular range in front of the vehicle 10 and receiving the reflection of the millimeter waves from an object outside the vehicle including a front vehicle, a pedestrian, or the like. The millimeter waves are radio waves having a wavelength of 1 mm to 10 mm and a frequency of 30 GHz to 300 GHz.

The millimeter wave radar device 12 resists severe weather, such as rain, fog, and snow, and is capable of detection over a long distance as compared with other radar devices.

As described above, the millimeter wave radar device 12 transmits millimeter waves frontward of the vehicle 10. Thus, the direction in which millimeter waves are transmitted from the millimeter wave radar device 12 is the direction extending from the rear to the front of the vehicle 10. The front side with respect to the transmission direction of millimeter waves is toward the front of the vehicle 10, and the rear side with respect to the transmission direction is toward the rear of the vehicle 10. The front side with respect to the transmission direction of millimeter waves will simply be referred to as the front side, and the rear side with respect to the transmission direction of millimeter waves will simply be referred to as the rear side.

The front grille 11 has a varying thickness (dimension in front-rear direction) in the same manner as a typical front grille. The front grille may be formed by applying a metal plated layer to the surface of a resin base. In such a case, the front grille will interfere with the transmitted and received millimeter waves. Thus, the front grille 11 includes a window 13 at a portion through which the millimeter waves from the millimeter wave radar device 12 pass, specifically, a portion frontward of the millimeter wave radar device 12 with respect to the transmission direction of the millimeter waves. A vehicle exterior part 20 is arranged in the window 13.

The vehicle exterior part 20 includes an ornamental body 31, a light diffuse reflection member 71, and a light source 81. Each portion of the vehicle exterior part 20 will now be described.

Ornamental Body 31

As shown in FIGS. 1 and 2, the ornamental body 31 decorates an exterior member of the vehicle 10 and has the form of a substantially elliptic plate, which is elongated in the transverse direction as a whole. The ornamental body 31 is slightly curved to bulge frontward.

Figure 3:
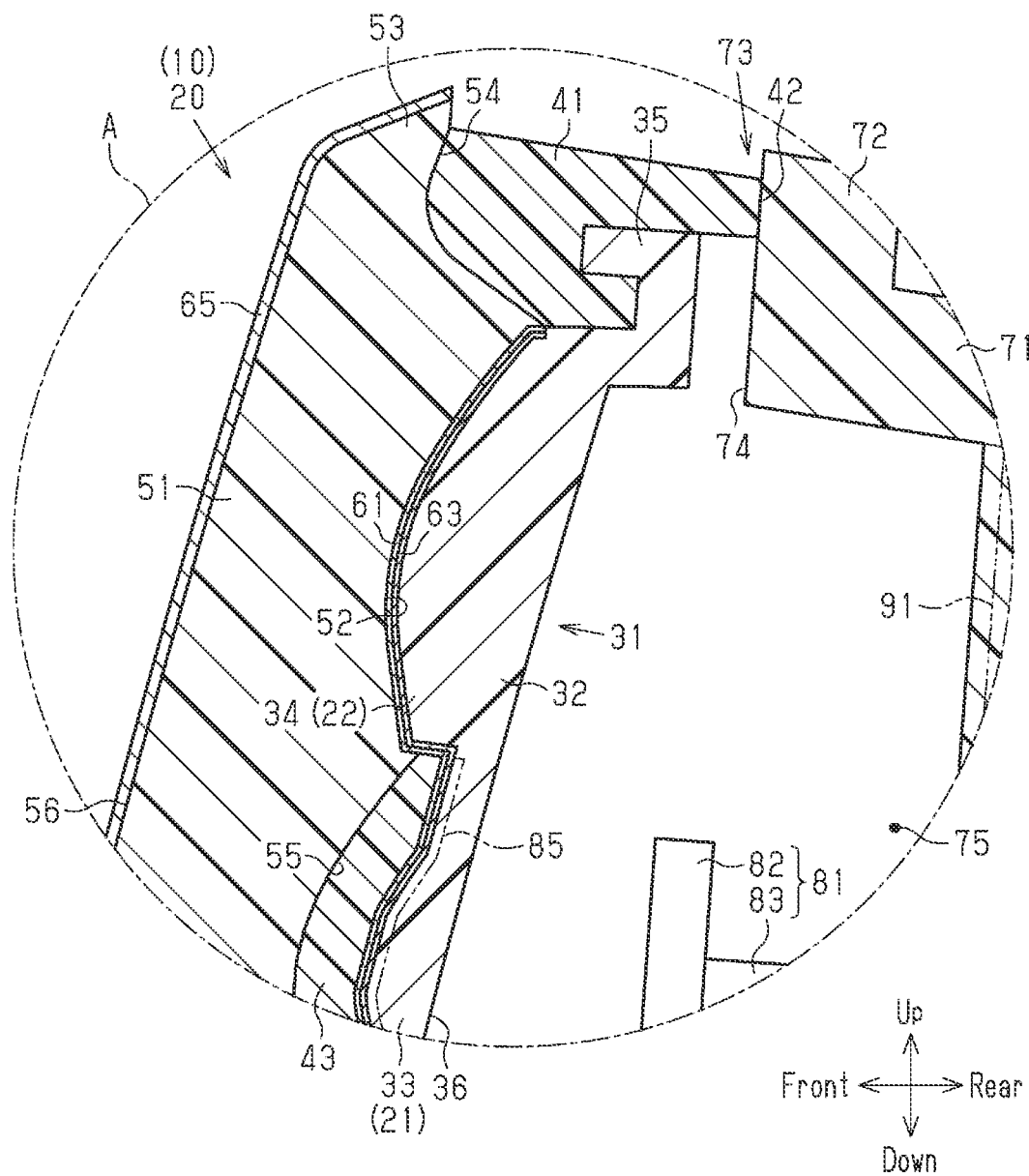
FIG. 3 is an enlarged cross-sectional side view illustrating section A of FIG. 2.

As shown in FIGS. 2 and 3, the ornamental body 31 includes a rear base 32, a light shield, a front base 51, an ornamental layer 61, a protection layer 63, and a hard coating layer 65. FIG. 2 does not show the ornamental layer 61, the protection layer 63, and the hard coating layer 65.

Rear Base 32

The rear base 32 corresponds to the base recited in the claims. The rear base 32 is a member that forms the rear half of the ornamental body 31. The rear base 32 is millimeter wave-transmissive and transmits millimeter waves sent from the millimeter wave radar device 12.

The rear base 32 is made of a resin material in which particles of a white light diffusing material are dispersed. Copolymerized polycarbonate is used as the resin material. A metal oxide such as titanium oxide, zinc oxide, or the like is used as the light diffusing material. The rear base 32 diffuses and transmits light that enters the rear base 32 so that the light becomes white.

The resin material may be acrylonitrile styrene (AS) resin, polycarbonate (PC) resin, polymethyl methacrylate (PMMA) resin, or the like. The light diffusing material may be barium sulfate, silica, or the like.

AS resin has a lower water absorption rate. Thus, the use of AS resin as the resin material will limit changes in electrical characteristics such as dielectric constant, dielectric loss tangent, and the like and maintain the millimeter wave transmittance even when the vehicle exterior part 20 is used under, for example, hot and humid conditions. Further, as long as the vehicle exterior part 20 is made of AS resin, heat resistance and product rigidity will not be decreased as a result of water absorption. Thus, AS resin is a suitable resin material for the rear base 32. In this case, barium sulfate that exhibits effective optical characteristics for AS resin is suitable as the above light diffusing material.

The rear base 32 includes a general portion 33 and a band-shaped projection 34 that projects frontward from the general portion 33. The general portion 33 corresponds to a background 21 of the vehicle exterior part 20 shown in FIG. 1. The projection 34 corresponds to a pattern 22 of the vehicle exterior part 20. In this case, the pattern 22 is formed by a character portion 23 and a ring portion 24 surrounding the character portion 23.

As shown in FIGS. 2 and 3, the rear base 32 includes a rear surface 36, which is formed by a single smooth surface that is gradually curved so as to be concaved toward the front.

Light Shield

The light shield includes a peripheral light shield 41 and an intermediate light shield 43. The peripheral light shield 41 and the intermediate light shield 43 are made of a mixed material of, for example, PC resin and carbon black. The peripheral light shield 41 and the intermediate light shield 43 have a black color and absorb light to block the transmission of light. The peripheral light shield 41 is arranged along a peripheral edge 35 of the rear base 32 and has the form of an elliptic loop. The peripheral light shield 41 contacts the peripheral edge 35. The intermediate light shield 43 is surrounded by the peripheral light shield 41 and located frontward of the general portion 33 of the rear base 32.

Front Base 51

The front base 51 is a transparent member that forms the front half of the ornamental body 31. The front base 51 is made of PC resin. The front base 51 is located frontward of the rear base 32 and the light shield (peripheral light shield 41 and intermediate light shield 43). Transparency includes colorless transparency and colored transparency (color transparency). The front base 51 may be made of a transparent resin such as PMMA instead of PC resin.

The rear part of the front base 51 is shaped in conformance with the front parts of the rear base 32 and the light shield. That is, the rear part of the front base 51 that is located frontward of the projection 34 of the rear base 32 includes a recess 52, which is curved frontward. Further, the rear surface of a peripheral edge 53 of the front base 51 includes a ring-shaped recess 54, which is curved frontward. The ring-shaped recess 54 is in contact with the peripheral light shield 41. The rear part of the front base 51 that is located frontward of the intermediate light shield 43 includes a recess 55, which is curved frontward. The recess 55 is in contact with the intermediate light shield 43.

The front base 51 includes a front surface 56 formed by a single smooth surface curved to bulge forward in correspondence with the rear surface 36 of the rear base 32.

Ornamental Layer 61

As shown in FIG. 3, the ornamental layer 61 is arranged between the rear base 32 and the intermediate light shield 43 and between the rear base 32 and the front base 51. Specifically, the ornamental layer 61 is arranged between the projection 34 and the recess 52 in front of the projection 34. Further, the ornamental layer 61 is arranged between the intermediate light shield 43 and the general portion 33 in front of the general portion 33. That is, the ornamental layer 61 is arranged frontward of the projection 34 where the projection 34 is arranged. The ornamental layer 61 is arranged on the rear surface of the intermediate light shield 43 where the intermediate light shield 43 is arranged.

The ornamental layer 61 is formed by a metal film. If the entire metal film were to be formed continuously, the ornamental layer 61 would block or attenuate millimeter waves. Thus, a metal material such as indium (In) is sputtered or deposited to form the metal film in island structures. In the island structures, the entire metal film is not continuous, and multiple fine metal films are laid out slightly spaced apart from one another or partially in contact with one another. With this structure, the non-continuous metal film increases the electric resistance and allows for the transmission of millimeter waves. The ornamental layer 61 has metallic luster.

Protection Layer 63

The protection layer 63 is arranged between the ornamental layer 61 and the rear base 32 to cover and protect the ornamental layer 61 from the rear. The protection layer 63 is made of a colorless transparent material or a colored transparent material. In the present embodiment, the protection layer 63 is formed by a urethane paint. The protection layer 63 is millimeter wave-transmissive.

Hard Coating Layer 65

The hard coating layer 65 is transparent and millimeter wave-transmissive. The hard coating layer 65 is formed by coating the front surface 56 of the front base 51 with a known hard coating agent. The hard coating agent may be, for example, an organic hard coating agent such as acrylate, oxetane, silicone, or the like, an inorganic hard coating agent, or an organic-inorganic hybrid hard coating agent.

The hard coating layer 65 is arranged at the front end of the ornamental body 31. The front surface of the hard coating layer 65 forms an ornamental surface of the vehicle exterior part 20.

The hard coating layer 65 protects the front base 51 from scratches. The hard coating layer 65 also protects the vehicle exterior part 20 from deformation and wear resulting from sun, wind, rain, temperature changes, and the like.

Light Diffuse Reflection Member 71

As shown in FIGS. 2 and 3, the light diffuse reflection member 71 is arranged rearward from the ornamental body 31. The light diffuse reflection member 71 is millimeter wave-transmissive.

The entire light diffuse reflection member 71 is formed from a resin material in which a white light diffusing material is dispersed. In the present embodiment, the resin material includes acrylonitrile-butadiene-styrene copolymers (ABS). Instead, other resin materials such as a polymer alloy of PC resin and ABS resin may be used. In this case, the same light diffusing material as the light diffusing material dispersed in the rear base 32 is used.

When the light diffuse reflection member 71 is irradiated with light, the light diffuse reflection member 71 diffuses and reflects the light so that the light becomes white.

The peripheral light shield 41 forming the peripheral edge of the ornamental body 31 is joined with a peripheral edge 72 of the light diffuse reflection member 71 by an annular joining portion 73.

Specifically, a rear end surface 42 of the peripheral light shield 41 is welded to a front surface 74 of the peripheral edge 72 of the light diffuse reflection member 71 through ultrasonic welding or the like. The ultrasonic welding applies pressure and ultrasonic waves to joined surfaces of two resin components to generate vibration and heat so that friction melts and joins the resin components to each other. In this case, the two resin components are the light diffuse reflection member 71 and the peripheral light shield 41, and the joined surfaces are the rear end surface 42 and the front surface 74. The peripheral light shield 41 and the light diffuse reflection member 71 are welded to each other at the annular joining portion 73. In this case, instead of ultrasonic welding, a different type of welding may be performed, for example, laser welding, hot plate welding, or the like.

The area surrounded by the joining portion 73 between the ornamental body 31 and the light diffuse reflection member 71 defines an accommodating portion 75. A passage section 76 through which millimeter waves transmitted from the millimeter wave radar device 12 pass is defined in the accommodating portion 75. The passage section 76 is separated from the joining portion 73 and located inward from the joining portion 73.

Light Source 81

As shown in FIGS. 2 and 3, the light source 81 is formed by a light-emitting diode (LED) chip. In the first embodiment, there is more than one light source 81. Each light source 81 includes a substrate 82 and an LED chip 83 mounted on the substrate 82.

The light sources 81 are arranged in the accommodating portion 75 outside the passage section 76. In the first embodiment, some of the light sources 81 are arranged at positions located upward from the passage section 76, and the other light sources are arranged at positions located downward from the passage section 76.

The light sources 81, the ornamental body 31, and the light diffuse reflection member 71 are arranged so that the light diffuse reflection member 71 diffuses and reflects the light emitted from the light sources 81 toward the rear base 32.

Light is reflected toward the ear base 32 by arranging the LED chip 83 of each light source 81 at the rear side of the substrate 82. The LED chip 83 of each light source 81 is located in front of the light diffuse reflection member 71 and emits light rearward.

The vehicle exterior part 20 is arranged upright in the window 13 of the front grille 11 and attached to the front grille 11. The vehicle exterior part 20 can be attached to the front grille 11 in any manner. The vehicle exterior part 20 is attached to the front grille 11 by, for example, clips, screws, hooks, or the like. The vehicle exterior part 20 may be attached to a vehicle body (not shown) instead of the front grille 11.

The operation of the first embodiment will now be described. The advantages of the operation will also be described.

With the vehicle exterior part 20 in the first embodiment, the peripheral light shield 41 forming the peripheral edge of the ornamental body 31 is joined with the peripheral edge 72 of the light diffuse reflection member 71 by the annular joining portion 73 to define the accommodating portion 75 formed by a closed space. The accommodating portion 75 accommodates the light sources 81. Thus, the light sources 81 are covered by the ornamental body 31 and the light diffuse reflection member 71. External force applied to the vehicle exterior part 20 is absorbed by the ornamental body 31 and the light diffuse reflection member 71 so that the external force does not act on the light sources 81. This protects the light sources 81 from external force.

The joining portion 73 is formed by welding the rear end surface 42 of the peripheral light shield 41 and the front surface 74 of the peripheral edge 72 of the light diffuse reflection member 71. Thus, the joining portion 73 seals the gap between the peripheral light shield 41 and the peripheral edge 72. This improves waterproof properties and prevents rainwater, water melting from snow or ice, water used for car washing, and the like from entering the accommodating portion 75 through the gap between the peripheral light shield 41 and the peripheral edge 72.

The protection layer 63 covers and protects the ornamental layer 61 from the rear. The protection layer 63 restricts separation of the ornamental layer 61 from the front base 51 and maintains the ornamental layer 61 in contact with the front base 51.

Millimeter waves transmitted from the millimeter wave radar device 12 sequentially pass through the light diffuse reflection member 71, the accommodating portion 75, and the ornamental body 31. The millimeter waves transmitted from the millimeter wave radar device 12 pass through the passage section 76 separated from the joining portion 73 and located inward from the joining portion 73 (refer to FIGS. 1 and 2). Thus, the transmitted millimeter waves all pass through the accommodating portion 75. The transmitted millimeter waves do not pass through the outer side of the accommodating portion 75.

The LED chips 83 of the light sources 81 are arranged in the accommodating portion 75 at positions located upward or downward from the passage section 76. Thus, the millimeter waves transmitted from the millimeter wave radar device 12 pass through the section of the accommodating portion 75 where the light sources 81 are not arranged. The light sources 81 do not block the passage of the millimeter waves transmitted from the millimeter wave radar device 12.

The millimeter waves passing through the ornamental body 31 are reflected by objects in front of the vehicle, such as a front vehicle, a pedestrian, or the like, and then sequentially pass through the ornamental body 31, the accommodating portion 75, and the light diffuse reflection member 71. The millimeter waves are received by the millimeter wave radar device 12. The ornamental layer 61 including the metal film has the island structures and is not continuous. Thus, the ornamental layer 61 has a high electric resistance and is millimeter wave-transmissive.

The millimeter wave radar device 12 uses the transmitted and received millimeter waves to recognize an object and detect the distance between the vehicle 10 and the object, the relative velocity of the vehicle 10 and the object, and the like.

The LED chips 83 of the light sources 81 emit light rearward. The light diffuse reflection member 71 is located rearward from the light sources 81. Thus, the light emitted from the light sources 81 strikes the light diffuse reflection member 71. The light striking the light diffuse reflection member 71 is diffused and reflected when colliding with the particles of the white light diffusing material dispersed in the resin material of the light diffuse reflection member 71. The light diffused and reflected by the light diffuse reflection member 71 into white light is directed toward the rear base 32. When the light entering the rear base 32 collides with the particles of the white light diffusing material dispersed in the resin material, the light is diffused into white light when transmitted through the rear base 32.

Thus, when the vehicle exterior part 20 is viewed from the front of the vehicle 10, the ornamental body 31 will be bright white and visible. In particular, the light emitted from the light sources 81 is diffused and reflected by the light diffuse reflection member 71 and then diffused by and transmitted through the rear base 32. Thus, when the vehicle exterior part 20 is viewed from the front of the vehicle 10, the vehicle exterior part 20 will be visible in brighter white than when the light emitted from the light sources 81 is diffused by only one of the light diffuse reflection member 71 and the rear base 32.

Referring to FIG. 3, part of the visible light entering the vehicle exterior part 20 from the front sequentially passes through the hard coating layer 65 and the front base 51.

Part of the visible light is absorbed by the peripheral light shield 41 and the intermediate light shield 43 arranged in the background 21. Thus, when the vehicle exterior part 20 is viewed from the front of the vehicle 10, the peripheral light shield 41 and the intermediate light shield 43 viewed through the hard coating layer 65 and the front base 51 will be visible at the rear side of (behind) the hard coating layer 65 and the front base 51. The peripheral light shield 41 and the intermediate light shield 43 have a black color. Thus, members located rearward from the peripheral light shield 41 and the intermediate light shield 43 will not be visible.

Part of the visible light is reflected by the ornamental layer 61 arranged in the pattern 22. Thus, when the pattern 22 of the vehicle exterior part 20 is viewed from the front of the vehicle 10, the ornamental layer 61 will be viewed through the hard coating layer 65 and the front base 51 and be visible at the rear side of (behind) the hard coating layer 65 and the front base 51. In the pattern 22, the ornamental layer 61 is arranged between the recess 52 and the projection 34 so that the ornamental layer 61 will have a forwardly projected three-dimensional appearance. The ornamental layer 61 includes a metal film. This gives the ornamental layer 61 a metallic luster.

In this manner, the vehicle exterior part 20 is decorated with the intermediate light shield 43 arranged in the background 21, the ornamental layer 61 arranged in the pattern 22, and the peripheral light shield 41 arranged in the peripheral edge of the ornamental body 31. This improves the appearance of the vehicle exterior part 20 and its surroundings.

Second Embodiment

The vehicle exterior part 20 according to a second embodiment will now be described.

In the second embodiment, as shown by the long-dash double-short-dash line in FIG. 3, a light reflector 85 that reflects light toward the rear is arranged between the general portion 33 and a portion of the protection layer 63 that is located rearward from the intermediate light shield 43. The light reflector 85 may be, for example, a reflection sheet that reflects light. The light reflector 85 is attached to the rear surface of the protection layer 63 at the above location by a pressure-sensitive adhesive, an adhesive, or the like. Alternatively, the light reflector 85 may be formed by a coating film in which particles of a white light diffusing material are dispersed. Alternatively, the light reflector 85 may be made of a resin material in which a white light diffusing material is dispersed.

Otherwise, the second embodiment is the same as the first embodiment. Thus, the same reference numerals are given to those components that are the same as the corresponding components described above in the first embodiment. Such components will not be described in detail.

The second embodiment has the following operation and advantages in addition to the above described operation and advantages of the first embodiment.

The light that is emitted from the light source 81, diffused and reflected by the light diffuse reflection member 71, and directed toward the intermediate light shield 43 strikes the light reflector 85. Then, the light reflected rearward by the light reflector 85 strikes the light diffuse reflection member 71. In this manner, the light diffused and reflected by the light diffuse reflection member 71 is bounded against the light reflector 85 and returned to the light diffuse reflection member 71. Thus, the light reflector 85 increases the amount of light that is diffused and reflected by the light diffuse reflection member 71. This increases the amount of light that is diffused by and transmitted through the rear base 32 and increases brightness of the light.

Third Embodiment

The vehicle exterior part 20 according to a third embodiment will now be described with reference to FIG. 4.

The rear base 32 includes the general portion 33 and the band-shaped projection 34 that projects frontward from the general portion 33. The intermediate light shield 43 is located at the front side of the general portion 33. The third embodiment is the same as the first embodiment in these respects.

The band-shaped projection 34 includes two side surfaces 37 and a top surface 38, which were not described in first embodiment. The two side surfaces 37 are located at opposite sides of the projection 34 in the width direction (upper and lower sides in FIG. 4). The side surfaces 37 are inclined with respect to the transmission direction (front-rear direction) so that the distance between the side surfaces 37, or the width of the projection 34, increases toward the rear. The side surfaces 37 may be inclined with respect to the front-rear direction at the same angle or at different angles. The top surface 38 is located at the front end of the projection 34 and connects the front ends of the two side surfaces 37.

In the third embodiment, a light block layer 87 that blocks light transmission is formed between the projection 34 and the ornamental layer 61 and protection layer 63 where the ornamental layer 61 and protection layer 63 face the side surfaces 37. The light block layer 87 is not arranged between the top surface 38 of the projection 34 and the ornamental layer 61 and protection layer 63. The light block layer 87 may be formed between the ornamental layer 61 and the protection layer 63 and general portion 33 at the rear side of the intermediate light shield 43 but does not necessarily have to be formed at the rear side of the intermediate light shield 43.

Otherwise, the third embodiment is the same as the first embodiment. Thus, the same reference numerals are given to those components that are the same as the corresponding components described above in the first embodiment. Such components will not be described in detail.

The operation and advantages of the third embodiment are the same as the first embodiment.

When the light sources 81 are switched off, the light sources 81 do not emit light that strikes the light diffuse reflection member 71. Thus, the light diffuse reflection member 71 will not diffuse or reflect light. As a result, the rear base 32 will now be irradiated with light from the light diffuse reflection member 71, and the rear base 32 will not diffuse or transmit light.

When visible light enters the vehicle exterior part 20 from the front, the intermediate light shield 43 will absorb and block transmission of part of the visible light. Thus, when the vehicle exterior part 20 is viewed from the front of the vehicle 10, members located rearward from the intermediate light shield 43 will not be visible.

Further, the portion of the ornamental layer 61 located at the front side of the projection 34 will reflect part of the visible light. Thus, when the vehicle exterior part 20 is viewed from the front of the vehicle 10, as described above, the ornamental layer 61 will have a forwardly projected three-dimensional appearance. That is, in the ornamental layer 61 on the projection 34, the portion formed on the top surface 38 will appear to be located frontward of the portions formed on the two side surfaces 37. Further, in the ornamental layer 61 on the projection 34, the portion formed on the two side surfaces 37 will appear to be located rearward from the portion formed on the top surface 38 and appear as a shadow.

In contrast, when the light sources 81 are switched on, if the light diffused by and transmitted through the rear base 32 were to strike the ornamental layer 61 at the portion formed on the top surface 38 and the portions formed on the two side surfaces 37, the light diffused by and transmitted through the rear base 32 will have the same brightness at the portion of the ornamental layer 61 formed on the top surface 38 and the portions of the ornamental layer 61 formed on the two side surfaces 37. In FIG. 4, W1 indicates the width of the ornamental layer 61 that is visible on the projection 34 in this case. The visible ornamental layer 61 on the projection 34 will be larger in the width direction of the projection 34 by dimensions corresponding to the two side surfaces 37 of the ornamental layer 61 than when the light sources 81 are switched off.

In this respect, the light block layer 87 is arranged between the side surfaces 37 of the projection 34 and the ornamental layer 61. The light block layer 87 absorbs light and blocks the transmission of light. Light diffused by transmitted through the rear base 32 will not reach the portions of the ornamental layer 61 formed on the side surfaces 37 of the projection 34.

The light block layer 87 is not formed between the top surface 38 of the projection 34 and the ornamental layer 61. Thus, light diffused by and transmitted through the rear base 32 will reach the portion of the ornamental layer 61 formed on the top surface 38 of the projection 34.

When the light sources 81 are switched on, the portion of the ornamental layer 61 on the projection 34 formed on the top surface 38 will be bright, while the portions of the ornamental layer 61 formed on the side surfaces 37 will not be bright. In FIG. 4, W2 indicates the width of the visible ornamental layer 61 brightened on the projection 34 in this case.

Accordingly, when the vehicle exterior part 20 is viewed from the front of the vehicle 10, the ornamental layer 61 that is visible on the projection 34 will have the same width regardless of whether the light sources 81 are switched on or off. This improves the ornamentality.

Fourth Embodiment

The vehicle exterior part 20 according to a fourth embodiment will now be described with reference to FIGS. 3, 5, and 6.

In the fourth embodiment, the ornamental layer 61 includes a metal film that is millimeter wave-transmissive and shifts the wavelength of the light emitted from the light sources 81. The metal film is made of indium. The fourth embodiment is the same as the first embodiment in these respects.

In the fourth embodiment, the protection layer 63 contains a pigment or dye that satisfies the following condition.

Condition: The color of light entering and passing through the protection layer 63 is shifted so that the color of the light after passing through the ornamental layer 61 becomes white.

When the metal film is made of indium as described above, the protection layer 63 contains a green pigment or dye.

Otherwise, the fourth embodiment is the same as the first embodiment. Thus, the same reference numerals are given to those components that are the same as the corresponding components described above in the first embodiment. Such components will not be described in detail.

Figure 5:
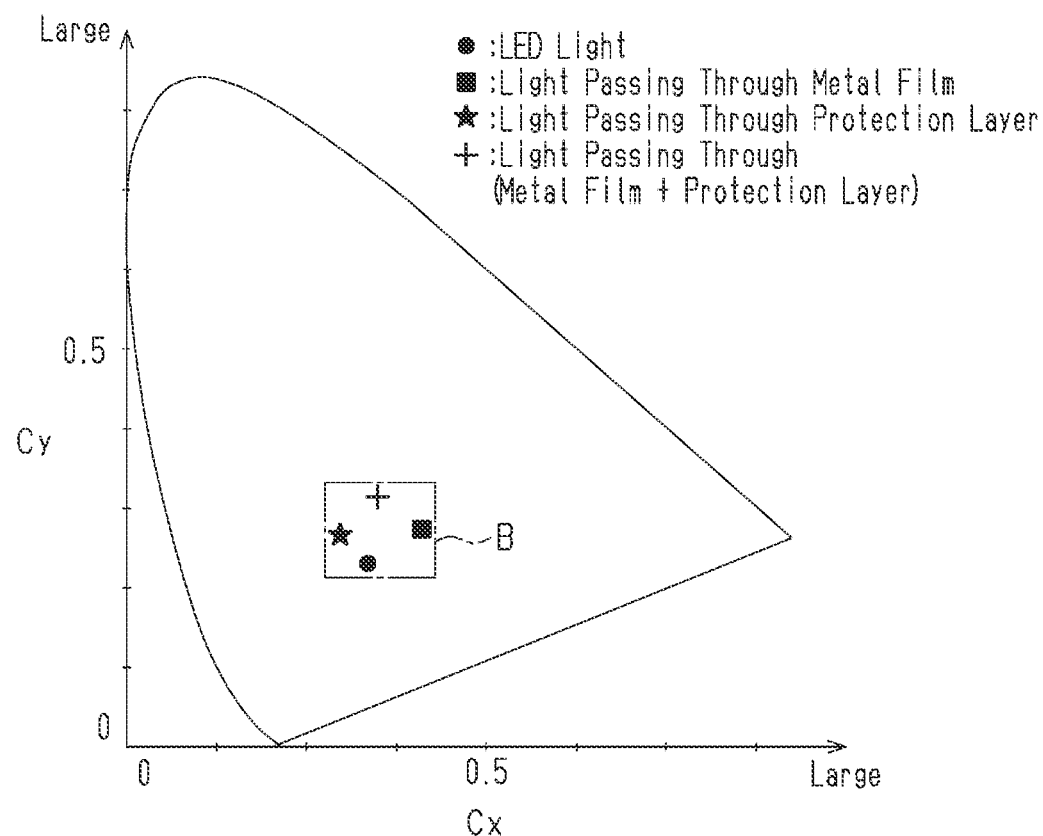
FIG. 5 is a chromaticity diagram illustrating an operation that adjusts light passing through an ornamental layer to become white.

FIG. 5 is a chromaticity diagram in which colors of light are represented in a (Cx, Cy) plane coordinate system. The colors of light are represented in coordinates of the chromaticity diagram. FIG. 6 is an enlarged view of section B of FIG. 5.

As described above, when the ornamental layer 61 includes a metal film, the color of the light passing through the ornamental layer 61 is shifted to a color differing from white. When the vehicle exterior part 20 is viewed from the front of the vehicle 10, the ornamental layer 61 will be illuminated in a shifted color that differs from white as described above.

Figure 6:
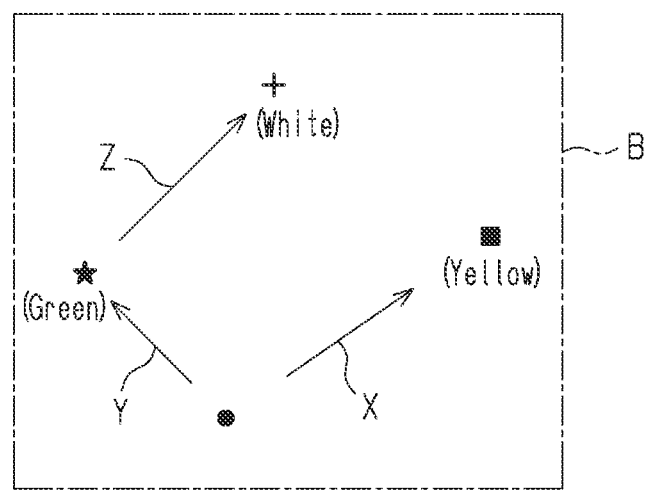
FIG. 6 is an enlarged view illustrating section B of FIG. 5.

When the metal film is made of indium, the color of the light passing through the ornamental layer 61 will be shifted to yellow as indicated by arrow X in FIG. 6. When the vehicle exterior part 20 is viewed from outside the vehicle 10, the ornamental layer 61 will be illuminated in yellow.

In the fourth embodiment, the protection layer 63 contains the above pigment or dye. Thus, the color of light entering and passing through the protection layer 63 is shifted so that the color of the light after passing through the ornamental layer 61 becomes white. The color-shifted light passes through the ornamental layer 61 so that the color of the light is adjusted to white on the blackbody locus.

The protection layer 63 contains the green pigment or dye as described above. The color of light entering and passing through the protection layer 63 is shifted (to green) by the green pigment or dye as shown by arrow Y of FIG. 6 so that the color of the light after passing through the ornamental layer 61 becomes white. The shifted green light passes through the ornamental layer 61 so that the color of the light is adjusted to white on the blackbody locus (not shown). Thus, when the vehicle exterior part 20 is viewed from the front of the vehicle 10, the ornamental layer 61 will be illuminated and visible in white.

The above-described embodiments may be modified as follows. The present embodiment and the following modifications can be combined as long as the combined modifications remain technically consistent with each other.

Rear Base 32

Figure 4:
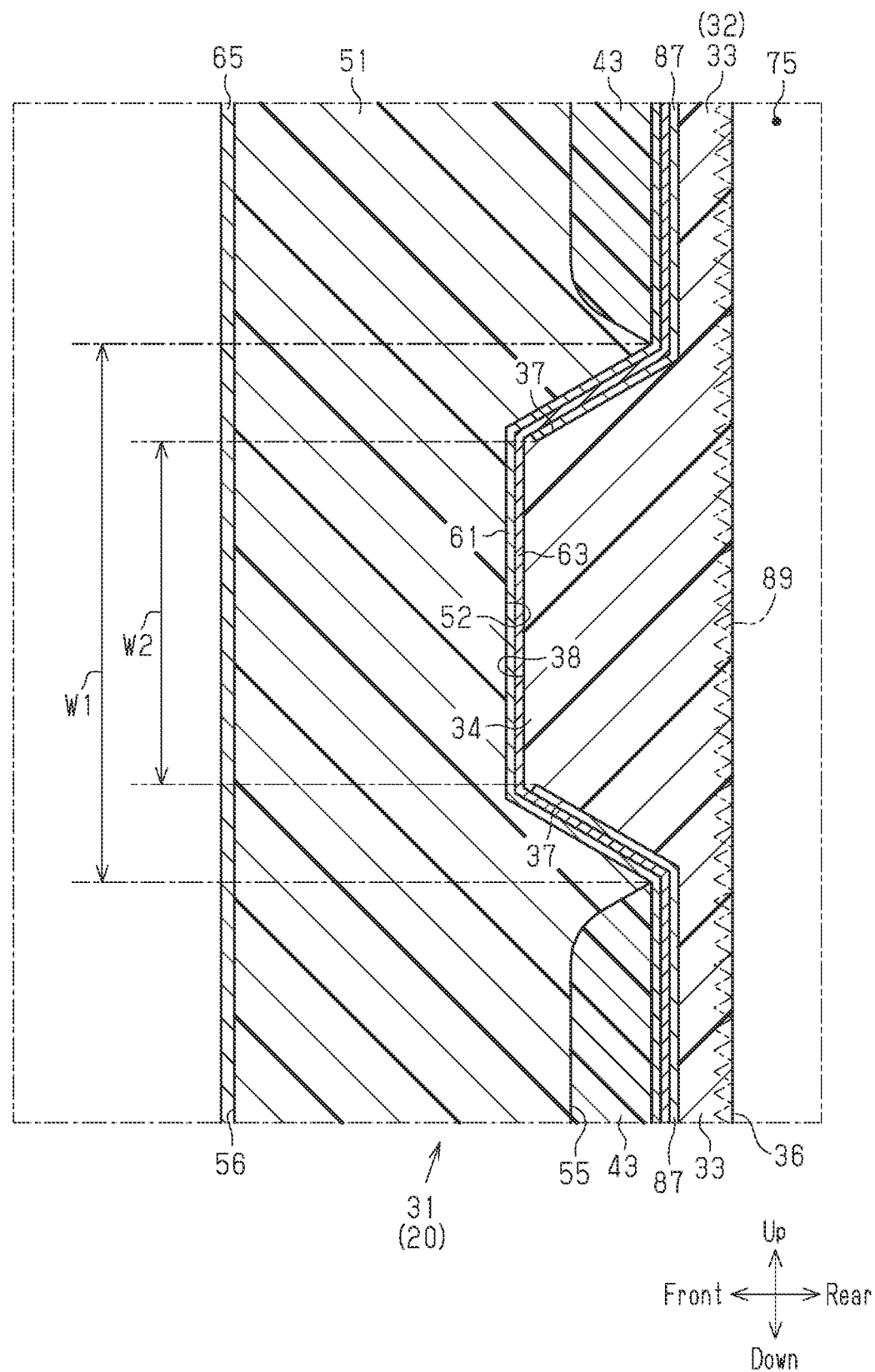
FIG. 4 is a cross-sectional side view illustrating an ornamental body according to a third embodiment.

Instead of diffusing light with the rear base 32 by dispersing a light diffusing material in the resin material for the rear base 32, the rear surface 36 of the rear base 32 may include a roughened portion 89 that diffuses and transmits the light that strikes the rear surface 36 as shown by the long-dash double-short-dash line of FIG. 4. In FIG. 4, the roughened portion 89 is exaggerated for illustration.

With this structure, when light diffused and reflected by the light diffuse reflection member 71 enters the roughened portion 89, the light is diffused by and transmitted through the roughened portion 89. Thus, the light that strikes the ornamental body 31 is diffused by and transmitted through the rear base 32 to become white.

Light Diffuse Reflection Member 71

As shown by the long-dash double-short-dash line in FIG. 3, the front end of the light diffuse reflection member 71 may include a light diffuse reflection layer 91 formed by a coating film in which particles of a white light diffusing material are dispersed In FIG. 3, the portion of the light diffuse reflection member 71 frontward of the long-dash double-short-dash line is the light diffuse reflection layer 91.

With this structure, light emitted from the light sources 81 strikes the light diffuse reflection layer 91 of the light diffuse reflection member 71. When the light collides with the light diffusing material, which is dispersed in the light diffuse reflection layer 91, the light is diffused and reflected.

Ornamental Layer 61

The metal film included in the ornamental layer 61 may be made of a metal material that differs from indium. When this modification is applied to the fourth embodiment, the protection layer 63 contains a pigment or dye that differs from the pigment or dye in the fourth embodiment.

Light Source 81

The quantity of the light sources 81 may differ from the above embodiments.

The light source 81 may be arranged in the accommodating portion 75 and located rightward or leftward away from the passage section 76.

A light source that emits light based on a principle that differs from the principle under which electroluminescent LEDs emit light may be used as the light source 81. Examples of such a light source include light sources that emit light through incandescence, fluorescence, electric discharge, chemiluminescence, laser luminescence, or the like.

Application of Vehicle Exterior Part 20

The vehicle exterior part 20 can be applied even when the millimeter wave radar device 12 is installed at a portion that differs from the front part of the vehicle 10 (i.e., rear part). In this case, the millimeter wave radar device 12 transmits millimeter waves rearward from the vehicle 10. The vehicle exterior part 20 is arranged frontward of the millimeter wave radar device 12 with respect to the transmission direction of the millimeter waves, that is, a portion of the vehicle 10 located rearward from the millimeter wave radar device 12.

The vehicle exterior part 20 can also be applied even when the millimeter wave radar device 12 is installed at a diagonally frontward portion or diagonally rearward portion of the vehicle 10.

The vehicle exterior part 20 can be applied anywhere as long as the vehicle exterior part 20 is installed at a portion of the vehicle 10 in front of the millimeter wave radar device 12 with respect to the transmission direction of the millimeter waves to decorate the vehicle 10 and have millimeter wave transmittance. Examples of applications to which the vehicle exterior part 20 is applied include an emblem, an ornament, a front grille, and the like.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle exterior part configured to be applied to a vehicle including a millimeter wave radar device that transmits millimeter waves, wherein the vehicle exterior part is configured to be arranged frontward of the millimeter wave radar device with respect to a transmission direction of the millimeter waves, the vehicle exterior part comprising:
    an ornamental body that is configured to decorate an exterior member of the vehicle;
    a light source that emits light; and
    a light diffuse reflection member that is millimeter wave-transmissive and diffuses and reflects the light,
    wherein
    the ornamental body includes:
        a base that is millimeter wave-transmissive and diffuses and transmits the light; and
        an ornamental layer that is millimeter wave-transmissive and arranged frontward of the base with respect to the transmission direction,
    the light source, the ornamental body, and the light diffuse reflection member are arranged so that the light emitted from the light source is diffused and reflected by the light diffuse reflection member and directed toward the base,
    the light diffuse reflection member is arranged rearward from the ornamental body with respect to the transmission direction,
    a peripheral edge of the ornamental body is joined with a peripheral edge of the light diffuse reflection member by an annular joining portion,
    an area surrounded by the annular joining portion between the ornamental body and the light diffuse reflection member defines an accommodating portion, and
    the light source is arranged in the accommodating portion, wherein
    the ornamental body includes, in addition to the base, a light shield that blocks transmission of the light,
    the light shield partially includes a peripheral light shield that contacts a peripheral edge of the base,
    the peripheral light shield is welded in contact with the peripheral edge of the light diffuse reflection member, and
    the peripheral light shield and the light diffuse reflection member are welded at the annular joining portion, wherein
    the light shield includes an intermediate light shield surrounded by the peripheral light shield and located frontward of the base with respect to the transmission direction, and
    a light reflector is arranged between the intermediate light shield and the base to reflect the light rearward with respect to the transmission direction.

2. The vehicle exterior part according to claim 1, wherein
    the base includes a general portion and a band-shaped projection that projects frontward from the general portion with respect to the transmission direction,
    the projection includes two side surfaces, with respect to a width direction, inclined with respect to the transmission direction so that a distance between the side surfaces increases toward the rear with respect to the transmission direction,
    the projection includes a top surface at a front end, with respect to the transmission direction, connecting the side surfaces,
    the intermediate light shield is arranged frontward of the general portion with respect to the transmission direction, and
    a light block layer that blocks transmission of the light is formed between the side surfaces of the projection and the ornamental layer and not formed between the top surface of the projection and the ornamental layer.

* * * * *